United States Patent [19]
Paul

[11] Patent Number: 5,593,472
[45] Date of Patent: Jan. 14, 1997

[54] GLASS FEEDER HEAT BAFFLE

[75] Inventor: Kenneth J. Paul, Tolland, Conn.

[73] Assignee: Emhart Glass Machinery Investments Inc., Wilmington, Del.

[21] Appl. No.: 552,325

[22] Filed: Nov. 2, 1995

[51] Int. Cl.$^6$ ............................. C03B 5/26; C03B 7/084
[52] U.S. Cl. ................. 65/327; 65/326; 65/328; 65/330; 65/362
[58] Field of Search ............................. 65/325, 326, 327, 65/328, 330, 362, 221, 126, 129, 128

[56] References Cited

U.S. PATENT DOCUMENTS

| | | | |
|---|---|---|---|
| 4,328,023 | 5/1982 | Vilk | 65/328 |
| 4,478,631 | 10/1984 | Mumford | 65/327 |
| 4,581,055 | 4/1986 | Bratton | 65/330 |
| 4,725,301 | 2/1988 | Stankosky et al. | 65/327 |
| 4,793,849 | 12/1988 | Bratton | 65/330 |

*Primary Examiner*—Donald E. Czaja
*Assistant Examiner*—Steven P. Griffin
*Attorney, Agent, or Firm*—Spencer T. Smith

[57] ABSTRACT

A tube assembly for use in a spout bowl assembly including a bowl for receiving molten glass having a central orifice closed by an orifice plate having one or more openings and a corresponding plurality of vertically reciprocating plungers associated with the orifice openings, the tube assembly comprising a tube mounted for rotation about a vertical axis. The tube includes a plurality of vent holes arranged horizontally around the tube, and a heat baffle including a cylindrical side wall and a bottom wall for closing the cylindrical side wall, an opening in the bottom wall for accommodating one or more reciprocating plungers. The bottom wall includes a downwardly projecting conical surface extending substantially around the bottom wall, and the heat baffle mounted so that the conical surface is horizontally adjacent the tube vent holes.

2 Claims, 2 Drawing Sheets

GLASS FEEDER HEAT BAFFLE

The present invention relates to machines like the I.S. or H28 machines which form discrete gobs of molten glass into glassware such as bottles or glasses and, more particularly, to glass feeders which continuously discharge one or more runners of molten glass which are sheared into the glass gobs.

Conventional glass feeders generally include a spout and tube assembly which is used to regulate the flow of glass between the spout and the tube. The spout supports a number of gas burners for heating the contained molten glass and a number of horizontally extending vent holes are defined in the tube, which is rotating, so that combustion gases can flow into the tube to heat the molten glass within the tube. To reduce the chimney effect, structures have been utilized to cap the tube including baffles such as shown in U.S. Pat. Nos. 4,478,631 and 4,328,023.

It is an object of the present invention to improve such a spout and tube assembly.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings.

Figure 1:
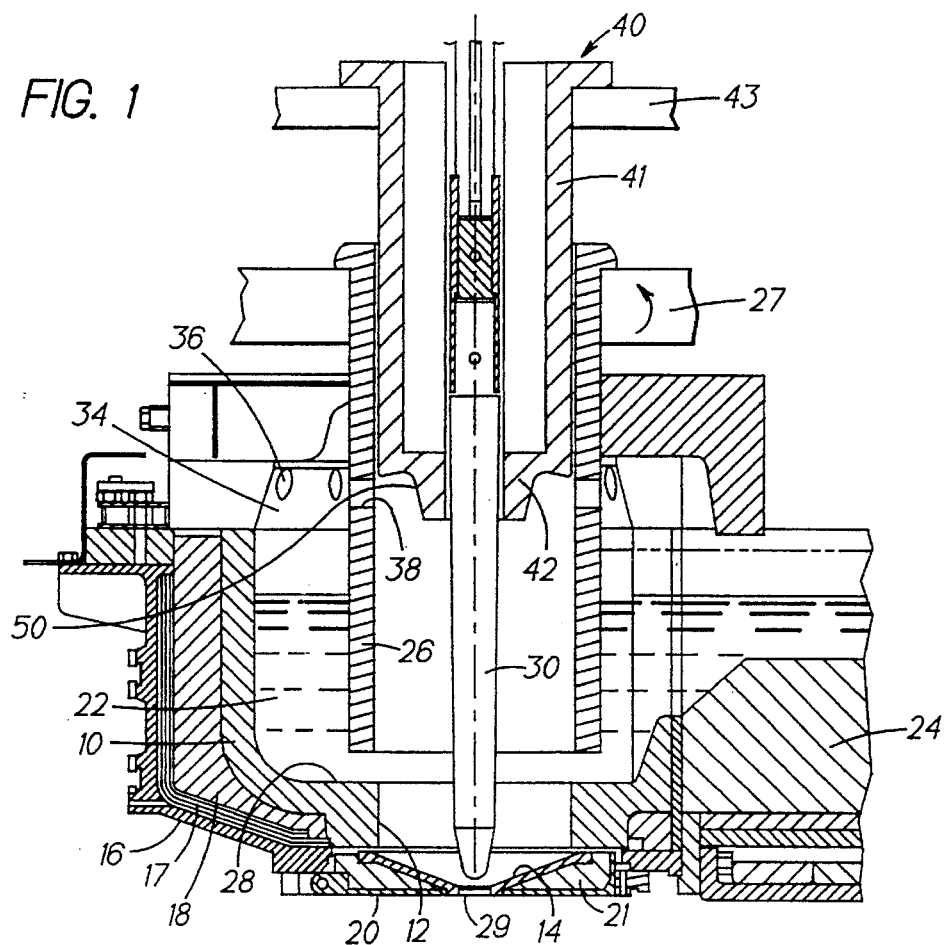
FIG. 1 is a cross-sectional view of a spout and tube assembly.

A spout and tube assembly includes a ceramic bowl 10 having a central orifice 12 in its bottom wall under which is secured a ceramic orifice ring 14. The bowl is supported by a housing 16 with insulation 17, 18 being located between the bowl and the housing. Additionally, the orifice ring is supported by a pivotal pan 20 which also supports insulation 21 against the orifice plate.

Molten glass 22 flows through a forehearth 24 into the bowl and flows through an annular clearance between a ceramic tube 26 which is supported by mechanism 27 for rotating the tube and the bottom inside surface 28 of the bowl, through the central orifice and out the holes 29 of the orifice plate (there will be one, two or three holes for single, double or triple gob operation). Movable plungers 30, one for each orifice hole, are selectively displaceable to control the shape of the gobs.

A plurality of burners (not shown) are supported by an annular burner block 34 to selectively introduce heat into the spout bowl through apertures 36 to maintain the glass temperature. Vents 38 are defined in the tube at the same height as the apertures 36 so that combustion gases can vent into the tube to heat the molten glass within the tube.

A heat baffle 40 which has a cylindrical side wall 41 and a closed bottom 42 and which is made in two identical pieces, is supported within the tube to substantially close the tube thereby minimizing heat loss up the tube. In the illustrated embodiment there are three plungers 30 (shown in phantom in FIG. 4) which are arranged in a line and the bottom 42 of the heat baffle 40 has an elongated cutout 46 for accommodating these plungers.

Figure 2:
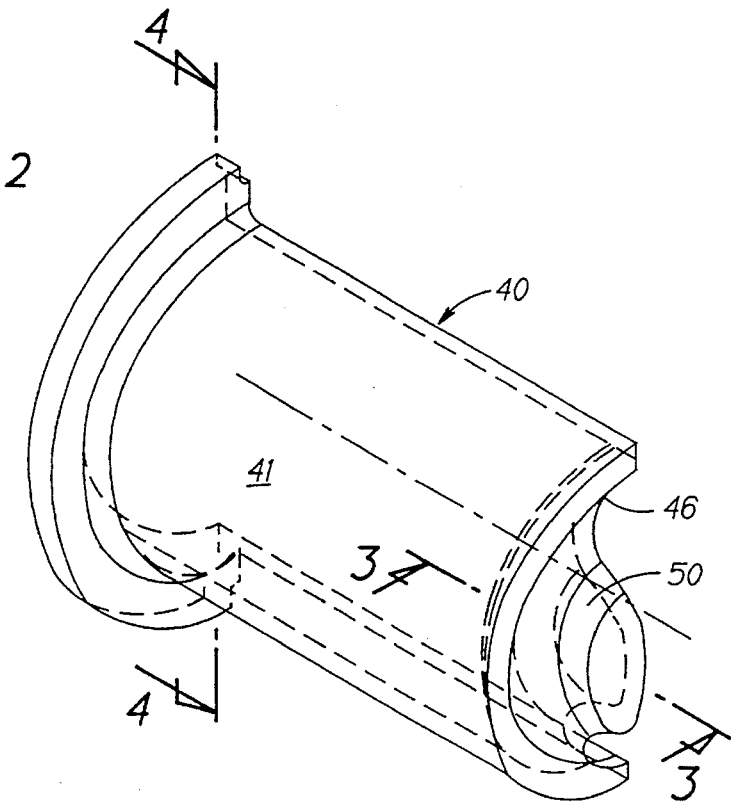
FIG. 2 is an oblique view of one half of the heat baffle shown in FIG. 1.
Figure 3:
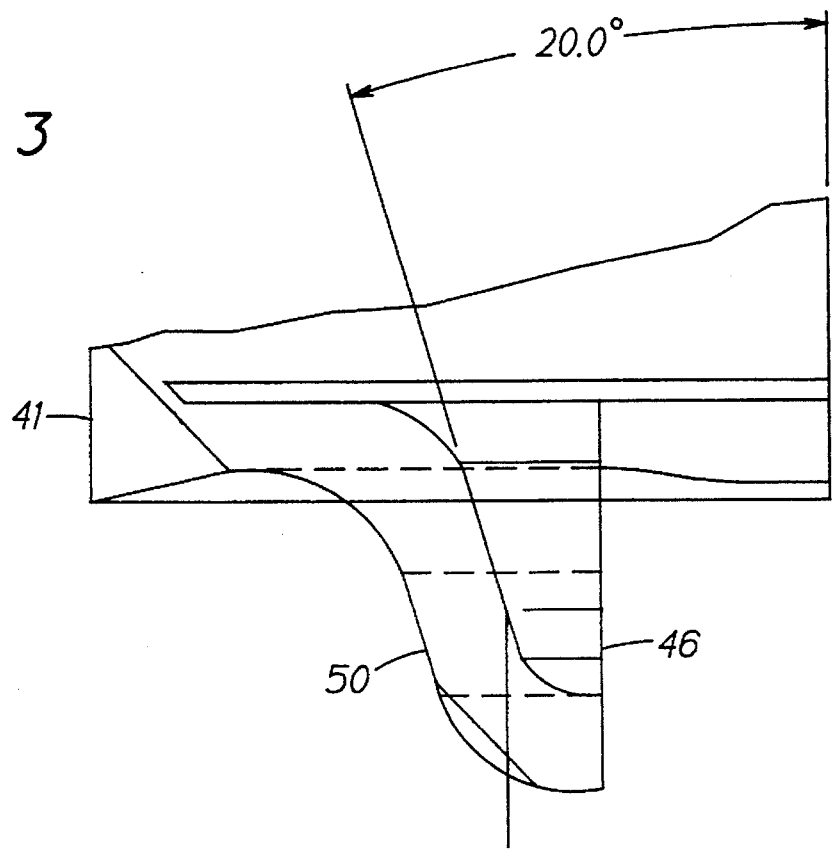
FIG. 3 is a view of the heat baffle half shown in FIG. 2 taken at 3—3 thereof.
Figure 4:
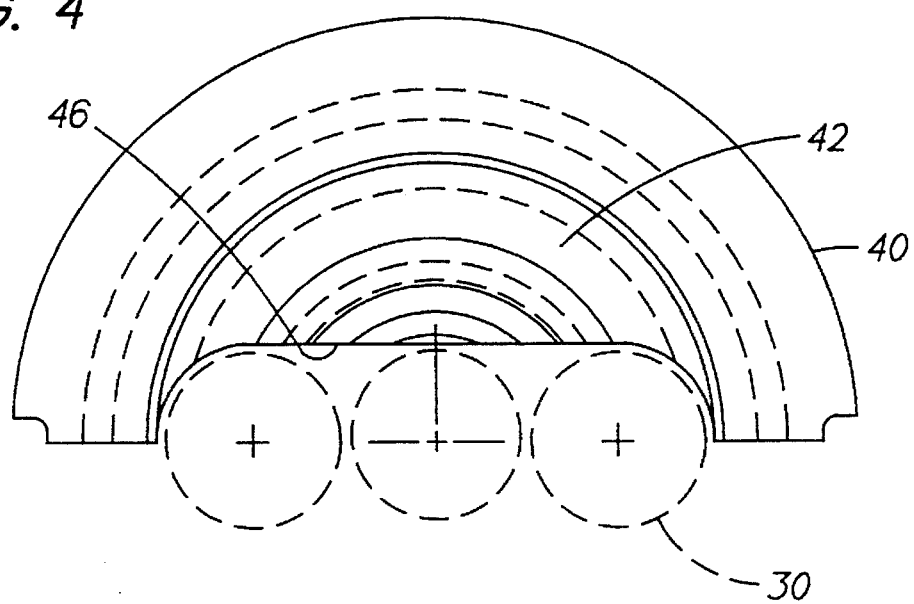
FIG. 4 is a view of the heat baffle half shown in FIG. 2 taken along 4—4 thereof.

The outside edge of the bottom of the heat baffle is located at the top of the vents and as can be seen in FIGS. 2–4 a conical surface 50 is defined on the bottom surface of the heat baffle which projects downwardly to about the bottom of the tube vent holes.

It has been found that hot air flowing through the tube vents can be redirected downwardly toward the surface of the molten glass within the tube to enhance the heating effect of these gases. The conical surface is discontinuous at the two locations where it intersects the elongated plunger opening.

I claim:

1. A tube assembly for use in a spout bowl assembly including a bowl for receiving molten glass having a central orifice closed by an orifice plate having one or more openings and a corresponding plurality of vertically reciprocating plungers associated with the orifice openings, said tube assembly comprising a tube mounted for rotation about a vertical axis, said tube including a plurality of vent holes arranged horizontally around the tube, and a heat baffle including a cylindrical side wall and a bottom wall for closing said cylindrical side wall, an opening in said bottom wall for accommodating one or more reciprocating plungers, said bottom wall including a downwardly projecting conical surface extending substantially around said bottom wall, and said heat baffle mounted so that said conical surface is horizontally adjacent said tube vent holes.

2. A tube assembly according to claim 1, wherein said opening in said bottom wall defines a pair of opposed discontinuities in said conical surface.

* * * * *